Oct. 11, 1960 | F. E. SINGELMAN | 2,956,116

TESTING CIRCUIT

Filed March 12, 1957

3 Sheets-Sheet 1

INVENTOR.
Fred E. Singelman
BY Donald W. Phillion
HIS ATTORNEY

INVENTOR.
Fred E. Singelman
BY Donald W. Phillion
HIS ATTORNEY

TESTING CIRCUIT

Filed March 12, 1957

INVENTOR.
Fred E. Singelman
BY Donald W. Phillion
HIS ATTORNEY

United States Patent Office 2,956,116

Patented Oct. 11, 1960

2,956,116

TESTING CIRCUIT

Fred E. Singelman, Palatine, Ill., assignor to Admiral Corporation, Chicago, Ill., a corporation of Delaware Filed Mar. 12, 1957, Ser. No. 645,574

3 Claims. (Cl. 178—6.8)

This invention relates, generally, to television receiver test equipment, and more particularly to test equipment for generating signals which will produce on a television screen a pattern of vertical bars, a pattern of horizontal bars, or a pattern consisting of a dot matrix.

Structure for generating signals which will produce vertical and horizontal bar patterns on a television screen is useful in testing both monochrome type receivers and color type receivers. Structure for generating test signals which will produce a dot matrix is useful in testing and adjusting the convergence of a three electron gun type color receiver so that each of the three electron beams will impinge upon only its proper phosphor in each group of phosphors. To produce the various patterns set forth above it is necessary to have a synchronizing signal so that the three electron beams will be turned on and off at the proper times as they are swept across the picture tube by horizontal and vertical deflection signals.

All of the known prior art devices of this type generate their own synchronizing signal and their own horizontal and vertical deflection signals. In order to generate such signals, circuitry, in addition to that needed to turn the electron beams on and off at the proper times is, of course, required. This additional circuitry is reflected in a high initial cost of the equipment, in high maintenance costs, and in bulkiness of the equipment.

An object of the present invention is to provide test equipment of the type under discussion that utilizes the horizontal and vertical synchronizing signals provided in an incoming composite video signal and, further, that utilizes the horizontal synchronizing pulses as its synchronizing signal source.

Another purpose of the invention is to provide inexpensive test equipment of the type under discussion.

A further object of the invention is to provide a lightweight, compact piece of test equipment of the type under discussion.

A fourth aim of the invention is to improve test equipment of the type under discussion, generally.

In accordance with the invention, means are provided to supply to a pulse shaping circuit the horizontal synchronizing pulses of the composite video signal being received by the television set being tested. The pulse shaping circuit functions to produce output pulses having a desired shape, a repetition rate equal to the repetition rate of the horizontal synchronizing pulses, and a constant phase relationship with the said horizontal synchronizing pulses.

These output pulses are supplied to a first oscillator means which is constructed to respond thereto to produce a signal whose frequency is a multiple of the repetition rate of the said output pulse and which is locked in synchronism with said output pulses. The output signal of this first oscillator means is supplied to the picture tube of the receiver to cause the three electron beams to be turned on and off to form a series of dots across the screen of the picture tube. Such a series of dots are formed each time the electron beams are swept across the screen; thus forming a series of vertical columns of dot which, to the human eye, appear as a series of vertical bars.

The output pulses of the pulse shaping circuit are also supplied to circuit means comprising a second oscillator means which is constructed to respond thereto to produce a signal consisting of a train of pulses whose repetition rate is a submultiple of the repetition rate of the said output pulses and which is locked in synchronism with said output pulses. The output pulses of the second oscillator, each of which has a time duration equal to several times the horizontal sweep time interval, are supplied to the picture tube of the television receiver to turn the electron beams on and off so as to produce a series of horizontal bars across the screen of the picture tube.

Switching means are provided to disable selectively either the first or second oscillator means, or to supply the output signal of said second oscillator means to said first oscillator means which is constructed to be gated thereby so as to oscillate only during the presence of a pulse from said second oscillator means. Thus, a matrix of dots will be formed on the screen of the picture tube; each dot occurring at points corresponding to the intersections of the vertical bars and the horizontal bars (if they could exist simultaneously). Further, each dot consists of a number of closely grouped impingements of the electron beams upon the screen of the color picture tube.

In accordance with a feature of the invention, the first oscillator means, when in a disabled condition, functions as an amplifier for the output signal of the second oscillator means.

The above-mentioned and other objects and features of the invention will be more fully understood from the following detailed description thereof, when read in conjunction with the drawings, in which.

Figure 1:
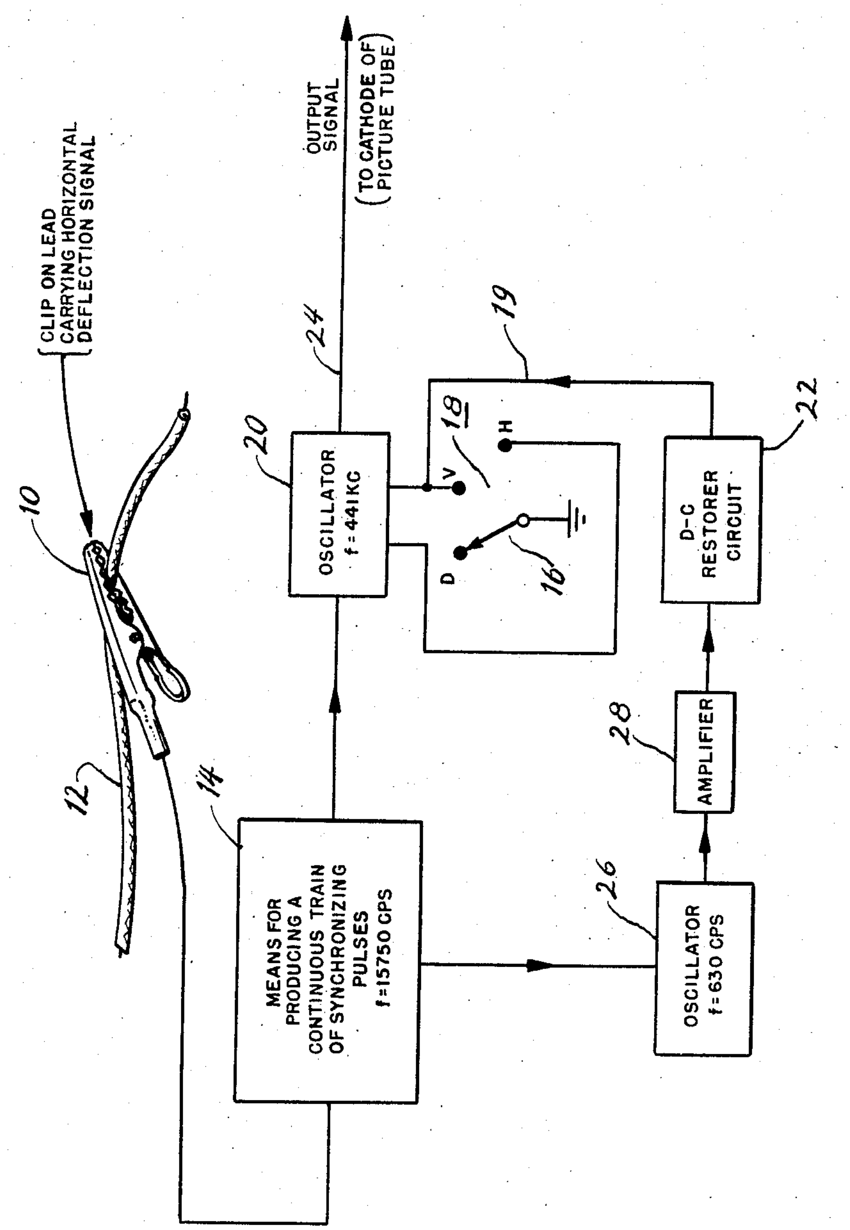
Fig. 1 is a block diagram of the invention.
Figures 3, 4, 5, 6, 7:
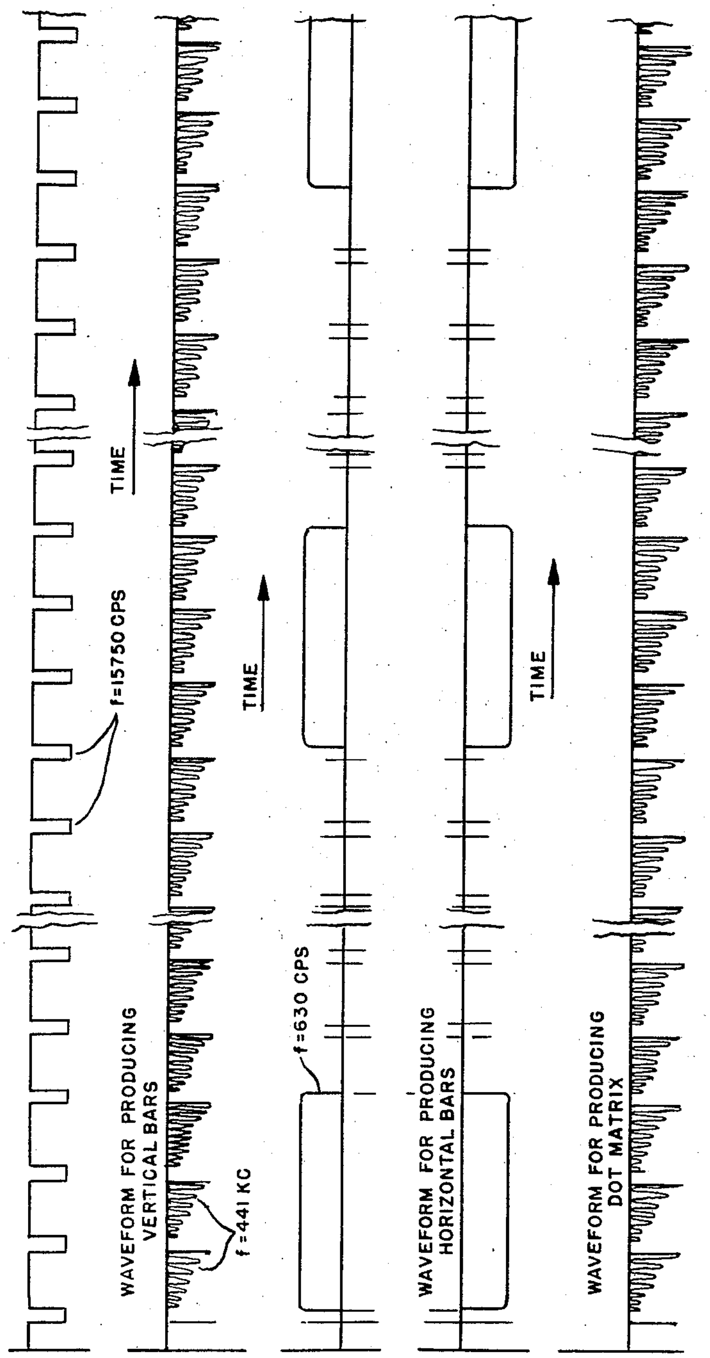
Fig. 3 is a waveform of a train of synchronizing pulses which are derived from the horizontal synchronizing pulses of the composite video signal received by the receiver being tested.
Fig. 4 is a waveform of the signal which produces vertical bars.
Fig. 5 is a waveform of the output signal of the circuit means comprising said second oscillator means.
Fig. 6 is a waveform of the signal which produces horizontal bars.
Fig. 7 is a waveform of the signal which produces a dot matrix on the screen of the television receiver picture tube.

Referring now to Fig. 1, a clip 10 is clipped over the insulated conductor 12 through which is conducted the horizontal deflection signal pulses having a repetition rate of 15,750 pulses per second. The conductor 12 is a part of the television receiver (not shown). Because of the capacitance existing between the clip 10 and the conductor 12, a part of the horizontal deflection signal will be supplied to the pulse shaping circuit 14, which is constructed to respond thereto to produce a train of pulses of a desirable shape and also having a repetition rate of 15,750 pulses per second. The waveform of such a train of pulses is shown in Fig. 3.

The structure of Fig. 1 is constructed to produce three different patterns on the screen of the television receiver picture tube (not shown). Selection of any one of these three patterns is effected by the switch 18, which has three positions labeled D, V, and H. When the arm 16 of the switch is in the D position, the structure will function to produce a dot matrix on the screen of the picture tube; when in the V position the structure will produce vertical bars on the picture tube screen, and when in the H position the device will produce horizontal bars on the picture tube screen. The structure of Fig. 1 and its operation will be discussed separately for each of the three switch positions, D, V, and H.

Assume, first, that the arm 16 of the switch 18 is in position V. Under these conditions the output signal of the D.-C. restorer circuit 22 will be grounded and will produce no signal on the output lead 24. However, the oscillator 20 will function to produce an output signal, having a waveform as shown in Fig. 4, which is supplied to the television receiver picture tube via the output conductor 24. The last-mentioned output signal will result in a series of vertical bars being formed on the screen of the picture tube. This occurs in the following manner: The output signal of pulse shaping circuit 14 is supplied to the oscilllator 20 and functions to synchronize the signal produced by the oscillator 20. It is to be noted that the frequency of the signal generated by the oscillator 20 is 441 kc., which is exactly 28 times the 15,750 pulses per second (p.p.s.) repetition rate of the output signal of the pulse shaping circuit 14. This 441 kc. output signal (Fig. 4) of the oscillator 20 is supplied to the cathodes of the picture tube of the television receiver. Thus, as the electron beams are swept across the screen at a rate of 15,750 times per second, they (the electron beams) are caused to be cut off during the positive portions of the 441 kc. signal and are caused to be turned on each time the polarity of the 441 kc. output signal of the oscillator 20 swings negative. Thus, the electron beam, in a single sweep across the screen, will produce 28 dots substantially equally spaced across the screen of the picture tube. This process is repeated each time the electron beam is swept across the screen. Consequently, a series of 28 vertical bars are formed on the screen, each bar consisting of a column of dots. It is to be noted that the horizontal and vertical deflection of the electron beams is caused by conventional horizontal and vertical sweep signals produced by circuitry normally provided therefor in the television set. The function of the test equipment is solely to produce signals which will turn the electron beam on and off at the proper times to produce the various desired patterns on the screen of the picture tube.

The circuit employed to form horizontal bars on the screen now will be discussed. Assume that the arm 16 of the switch 18 is closed upon the contact button H. Under these conditions the oscillator 20 is disabled as an oscillator in a manner which will be described in detail later, but will function as an amplifier for the output of the D.-C. restorer circuit 22.

The 15,750 p.p.s. output signal of the pulse shaping circuit 14 is supplied to the oscillator 26, which can be a blocking oscillator constructed to generate an output signal consisting of a train of pulses having a repetition rate of 630 pulses per second. It is to be noted that the 15,750 p.p.s. output signal of the circuit 14 functions to synchronize the 630 p.p.s. output signal of oscillator 26 therewith and that the repetition rate of the 15,750 c.p.s. signal is exactly 25 times the repetition rate of the 630 c.p.s. signal. The signal generated by the oscillator 26 is amplified by amplifier 28 to produce a signal which is then supplied to the D.-C. restorer circuit 22. The D.-C. restorer circuit functions to produce a signal having a pulsating component and a D.-C. component. The waveform of the pulsating component is shown in Fig. 5 and has a repetition rate of 630 p.p.s. The D.-C. component is negative in polarity and functions to bias the control grid of the tube of oscillator 20 (now acting only as an amplifier) below cutoff potential through conductor 19. Only during the positive peaks of the 630 p.p.s. signal supplied to the D.-C. restorer circuit 22 is the potential of the conductor 19 caused to increase so that the tube of the oscillator 20 will become operative. Thus, the pulsating component of the output signal of the voltage restorer circuit 22 is amplified by the oscillator 20. The output of amplifier 20, which now consists of a continuous train of 630 p.p.s. negative pulses, as represented by the waveform of Fig. 6, is supplied to the cathodes of the picture tube through conductor 24 and functions to turn on the three electron beams during the presence thereof. The 630 p.p.s. pulses each have a time duration equal to 3 or 4 times the horizontal scanning time of the electron beams so as to produce horizontal bars sufficiently wide as to be easily visible to the eye.

Since the repetition rate of the signal generated by the oscillator 26 is $\frac{1}{25}$ the repetition rate of the horizontal synchronizing signal pulses, horizontal bars will be created at intervals corresponding to every twenty-fifth horizontal line.

Consider now the case where it is desired to produce a dot matrix on the screen of the picture tube. Broadly speaking, this is accomplished by combining the circuits necessary to produce both the horizontal and the vertical bars. More specifically, the production of a dot matrix is accomplished in the following manner: The arm 16 of the switch 18 is closed on contact D. Under these conditions, the oscillator 20 functions as an oscillator to produce a 441 kc. signal which would, in the absence of the 630 p.p.s. signal being supplied thereto, produce a series of vertical bars on the picture tube screen. However, the 630 p.p.s. signal produced by the oscillator 26 also is supplied to the oscillator 20 (through the amplifier 28 and the D.-C. restorer circuit 22), and because of the negative D.-C. bias potential produced by the D.-C. restorer circuit 22, the oscillator 20 will function as an oscillator only during the presence of the (positive) pulses of the 630 p.p.s. signal. Thus, the output of the oscillator 20 consists of groups of short bursts of a 441 kc. signal having a waveform as shown in Fig. 7. These groups of signal bursts, which occur at a rate of 630 times per second, are supplied to the cathodes of the picture tube and function to produce a dot matrix on the screen thereof. Horizontally, there are 28 dots spaced across the screen of the picture tube, and vertically the dots are spaced apart a distance of twenty-five horizontal lines.

Figure 2:
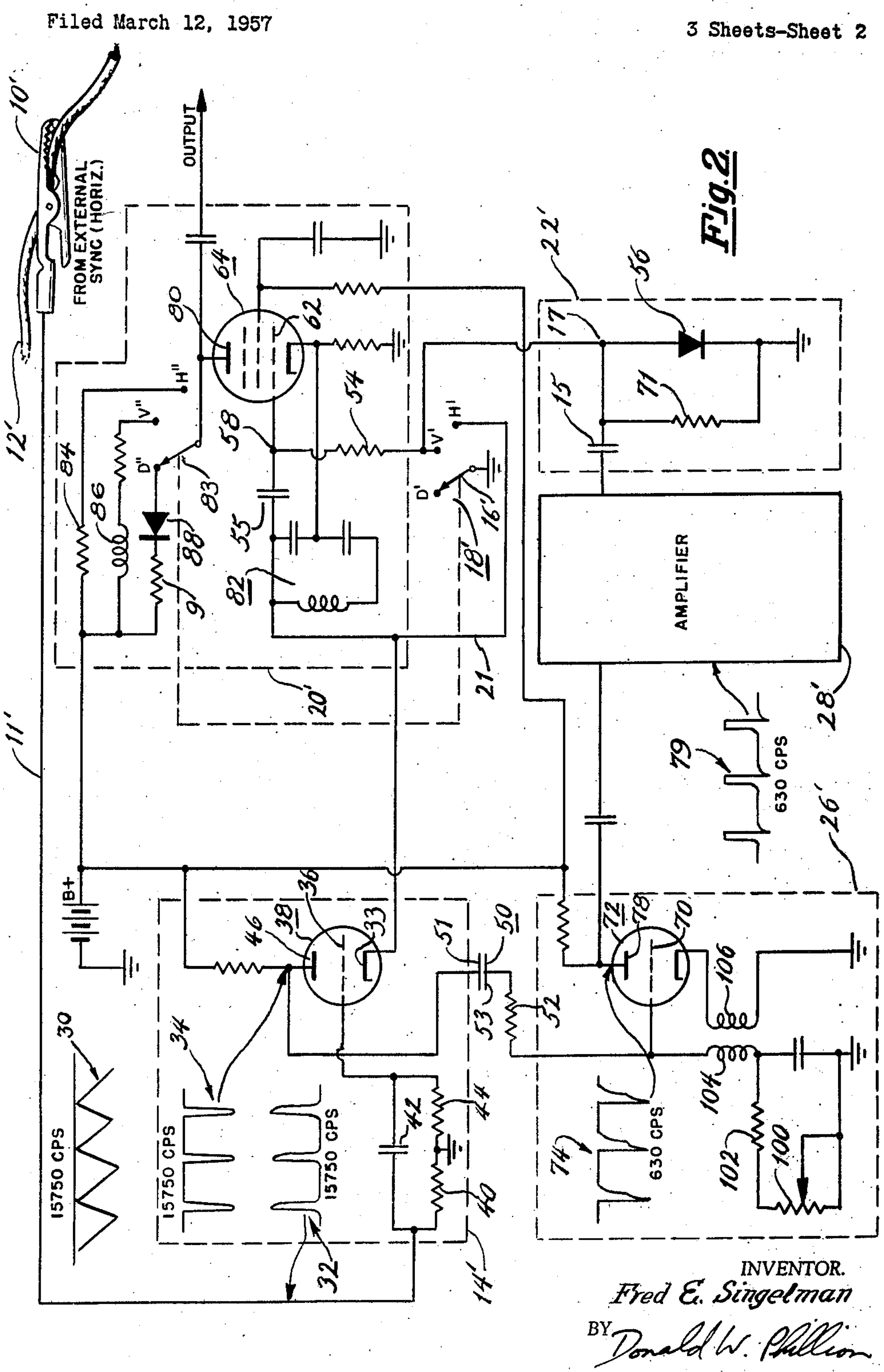
Fig. 2 is a schematic diagram of the block diagram shown in Fig. 1.

Referring now to Fig. 2, there is shown a schematic sketch of the invention. Elements of Fig. 2, which correspond to elements of Fig. 1, are identified by similar reference characters. More specifically, the broken line rectangles 14′, 20′, 26′, and 22′ of Fig. 2 correspond to the blocks 14, 20, 26, and 22, respectively, of Fig. 1. Block 28′ corresponds to block 28 of Fig. 1. Further, clip 10′, lead 12′, arm 16′ of switch 18′ and switch positions D′, V′, and H′ correspond to elements identified by similar reference characters (unprimed) in Fig. 1. Since the general operation of the circuit has been described with respect to the block diagram of Fig. 1, only a detailed description of the circuitry within the various dotted rectangles will be described with respect to the schematically shown circuit of Fig. 2.

The horizontal deflection signal represented by waveform 30 (Fig. 2) is supplied to the control grid 36 of the tube 38 via a differentiating circuit and a grid leak circuit. The differentiating circuit which comprises the capacitance (not specifically shown) between the clip 10′ and the conductor 12′, and the resistor 40 functions to produce a signal having a waveform 32. This signal is supplied to the control grid 36 of tube 38 through the aforementioned grid leak circuit which comprises capacitor 42 and resistor 44. The waveform 34 represents the signal appearing at the plate 46 of tube 38. This last mentioned signal is supplied to the oscillator 26′ through capacitor 50 and resistor 52, as will be discussed in detail later.

The cathode 33 of tube 38 is connected in a cathode follower arrangement. More specifically, the path of the A.-C. current flow through the tube 38 may be traced from the cathode 33, through the grid leak capacitor 55, the grid leak resistor 54, and the diode 56 to ground potential (assuming the arm 16′ of switch 18′ is not closed upon contact H, in which case the cathode 33 would be connected directly to ground potential through the conductor 21 and the switch 18′). The 15,750 p.p.s. signal, supplied from the pulse shaping circuit 14′ and appearing across the resistor 54 performs the function of synchronizing therewith the 441 kc. signal generated by the oscillator 20′. More specifically, the 15,750 p.p.s. signal appearing across the resistor 54 comprises a train of positively poled pulses. Each time one of these positive pulses occurs the potential of the control grid 62 of the tube 64 is increased to cathode potential so that the tube 64 loses its power to amplify the oscillatory signal, thus causing cessation of oscillations in the tuned circuit 82. When the positive pulse terminates, the trailing edge thereof, which will be negative-going, will initiate the first cycle of oscillation in the oscillator 20. Since said trailing edge is always negative-going and, if the circuit is carefully designed, since said trailing edge always occurs at the same time with respect to the horizontal synchronizing pulse signals, and thus also with respect to the horizontal sweep signals, the output signal of the oscillator will be synchronized properly with the horizontal sweep signals. The waveform of the resultant output signal of the oscillator 20′ is shown in Fig. 4.

Consider now the case where it is desired to produce a series of horizontal bars on the screen of the picture tube. The output voltage appearing at the plate 46 of the tube 38 is supplied to the control grid 70 of the tube 72 through the capacitor 50 and the resistor 52. The circuit 26′, which is a blocking oscillator constructed to operate at 630 c.p.s, is triggered and synchronized by the 15,750 p.p.s. signal supplied from the plate of tube 38. Although the theory of the triggering and synchronization of the blocking oscillator 26′ with the 15,750 p.p.s. signal supplied thereto is not clearly understood, a probable explanation is as follows: Assume, as a starting point, that there is a change on the capacitor 50 such that the potential of the control grid 70 of the tube 72 is below cutoff potential. Each pulse of the train of negatively poled pulses, which are supplied to the oscillator 26′ through the series combination of capacitor 50 and resistor 52, will cause the potential of the plates 51 and 53 of the capacitor 50 to decrease. However, with each negative pulse so supplied a current will flow from ground potential through resistor 100, resistor 102, winding 104, and resistor 52 to cause an incremental positive increase in the potential of the plate 53 of capacitor 50. These incremental increases in potential will accumulate until the potential of the plate 53 is sufficiently positive so that the potential of control grid 70, which is connected thereto through the resistor 52, will cause a plate current to flow in the tube 72. As this plate current begins to flow, a regenerative signal will be supplied to the control grid 70 through the inductive coupling comprising windings 104 and 106. Thus the plate current of tube 72 will be increased further. Such action continues until the plate current approaches the saturation point, at which time the action will become reversed and, in a well-known manner, will cause the potential of the grid 70 to decrease rapidly to a point well below ground potential (due to the rapid decrease in plate current and the consequent large negative voltage induced across the winding 104). The plate 53 of the capacitor will thereby again become negatively charged. Thus, the cycle is completed. By properly selecting the values of the circuit constants, the blocking oscillator can be caused to operate at 630 c.p.s. The resistor 100, which is part of the discharge path for the capacitor 50, is variable to permit fine tuning of the blocking oscillator. The waveform 74 (Fig. 2) represents the shape of the output signal of the blocking oscillator. This last mentioned signal is supplied to the amplifier 28′, which is responsive thereto to produce a signal having a waveform 79. The D.-C. restorer circuit 22′, which comprises the capacitor 15, the resistor 71, and the diode 56, functions to respond to the output signal of the amplifier to produce at the point 17 a negative D.-C. potential upon which is superimposed the positively poled pulses of the 630 p.p.s. signal (the waveform of which is shown in Fig. 5).

The output signal pulses of the restorer circuit are supplied to the grid 62 of pentode 64 through the resistor 54 and functions to produce at the plate 80 of tube 64 (which is now acting as an amplifier for reasons which will be described later) a signal similar to the signal supplied to the grid 62 thereof, but inverted in polarity. The waveform of this last-mentioned signal is shown in Fig. 6.

In the discussion above, it was assumed that the arm 16 was closed on contact button H′ to short out the resonant circuit 82 and thus disable the circuit 20′ from functioning as an oscillator.

When the arm 16′ is closed on the contact button D′, the circuit 20′ functions as an oscillator at a frequency of 441 kc. and the signal from the D.-C. restorer circuit 22′ functions to supply a 630 p.p.s. signal (see Fig. 5) to the grid 62 of tube 64 through the resistor 54. As discussed hereinbefore, a negative D.-C. bias exists at the point 17 due to the action of the D.-C. restorer circuit 22′. The positive going 630 c.p.s. pulses supplied to the D.-C. restorer will increase the potential of the point 17 to about ground potential, under which conditions the potential of the grid 62 of tube 64 will be of such a value that the oscillator 20′ will oscillate. However, in the absence of a 630 c.p.s. pulse the negative D.-C. bias existing at the point 17 will decrease the potential of the grid 62 of tube 64 below cutoff, thus causing a cessation of oscillations. Thus, the combination of the 441 kc. signal and the 630 c.p.s. signal will produce, at the plate 80 of tube 64, a signal having the waveform shown in Fig. 7. This last mentioned signal, when applied to the cathodes of the picture tube, will produce a dot matrix on the screen of the picture tube.

It will be observed that the switch 83, located in the plate circuit of pentode 64, is ganged with the switch 18′. The three positions D″, V″, and H″ of switch 83 correspond to the three positions D′, V′, and H′ of switch 18′. The function of switch 83 is to provide suitable plate loads for each of the three conditions; vertical bar production, horizontal bar production, or dot matrix production.

More specifically, it has been found that to produce horizontal bars a resistor 84 is best suited as a plate impedance for the pentode 64, and that for production of vertical bars the series combination of resistor 85 and peaking coil 86 is well suited as a plate impedance, and that for dot matrix production the peaking coil 86 alone is best suited as a plate impedance. The series combination of diode 88 and resistor 90 function to clip off undesired positive-going portions of the output signal of tube 64. Such positive-going portions of the output signal are undesirable, since the signal is supplied to the cathode of the picture tube and only negative-going signals will cause the electron beam to be turned on. It is to be noted, however, that the system can be designed to produce positive-going signals which can be supplied to a control grid of the picture tube to turn the electron beams on at the proper time.

It is to be noted, further, that the form of the invention herein shown and described is but a preferred embodiment thereof and that various changes may be made in the circuit arrangement and in the circuit components without departing from the spirit or scope of the invention.

I claim:

1. An electronic device for testing television receivers having an input circuit to be energized by the horizontal sync pulses of a television receiver, and means for supplying an output signal for directly modulating the video output of the television cathode ray tube comprising, a first oscillator means to produce a first output signal whose frequency is a multiple of the repetition rate of the horizontal deflecting signals in said receiver, second oscillator means to produce a second output signal whose frequency is a sub-multiple of the repetition rate of the horizontal deflecting signals, circuit means responsive to said horizontal deflecting signals to produce a signal for synchronizing the phase of said first and second output signals with the phase of said horizontal deflecting signals, a D.-C. restorer circuit, and means for connecting the output of said second oscillator means through said D.-C. restorer to the input of said first oscillator to thereby cause said first oscillator to oscillate only during portions of the output of said second oscillator having a selected polarity.

2. An electronic device for testing television receivers having an input circuit to be energized by the horizontal synchronizing pulses of a television receiver, and means for supplying an output signal for modulating the video output of a television cathode ray tube comprising, a first oscillator means to produce the first output signal whose frequency is a multiple of the repetition rate of the horizontal deflecting signals in said receiver, second oscillator means to produce a second oscillator signal whose frequency is a submultiple of the repetition rate of the horizontal deflecting signals, circuit means responsive to said horizontal deflecting signals to produce signals of opposite respective polarity for synchronizing the phase of said first and second output signals with the phase of said horizontal deflecting signals, a D.-C. restorer, circuit means for selectively: grounding the output of said D.-C. restorer and triggering said first oscillator means by one of said synchronizing signals; grounding the oscillator circuit of said first oscillator means and supplying the output of said D.-C. restorer to said first oscillator means to thereby space triggering pulses to said first oscillator means in accordance with the period of oscillation of said oscillating means; and for controlling said first oscillating means in accordance with the output of said D.-C. restorer circuit; and means for supplying the output of said first oscillating means in each instance directly to the video producing means.

3. Means for selectively producing test patterns including a dot matrix, a vertical bar pattern and a horizontal bar pattern on the screen of a cathode ray tube in a television receiver comprising: electron discharge means having first, second and third operating modes corresponding respectively to said test patterns; means for generating a first frequency signal which is a submultiple of said television receiver beam scan frequency; D.-C. restorer means coupled between the output of said generating means and the input of said discharge means; said discharge means when operating in said first mode generating a second frequency signal whose frequency is a multiple of the beam scan frequency, and mixing said generated second frequency signal with said first frequency signal appearing across said D.-C. restorer means; said discharge means when operating in said second mode generating said second frequency signal only; said discharge means amplifying said first signal frequency appearing across said D.-C. restorer means when operating in said third mode; means for selecting the operating mode of said discharge means; means coupling the output of said discharge means to said cathode ray tube; and means controlled by said beam scan frequency for synchronizing the oscillatory phase of said generating means and for keying said discharge means on at the beam scan frequency when said discharge means is operating in either its first or its second mode.

References Cited in the file of this patent

UNITED STATES PATENTS

| | | |
|---|---|---|
| 2,559,388 | Baldridge | July 3, 1951 |
| 2,818,526 | Meagher | Dec. 31, 1957 |

FOREIGN PATENTS

| | | |
|---|---|---|
| 233,313 | Switzerland | July 15, 1944 |

OTHER REFERENCES

Radio Electronics, January 1950, pages 65 and 66 (copy in U.S.P.O.).

Radio and Television News, August 1956, pages 63 to 65 and 123 (copy in U.S. Patent Office).

Radio and Television News, September 1954, pages 45 to 49.